United States Patent [19]  
Bottazzini et al.

[11] 4,056,853  
[45] Nov. 8, 1977

[54] SYSTEM FOR LOCKING, IN AN EASILY DISENGAGEABLE MANNER, THE LENSES TO EYEGLASSES, SPORTIVE SWIMMING GOGGLES OR DIVING MASKS AND SIMILAR GENERAL SPORTIVE ARTICLES, AND THE RESULTING ARTICLES

[75] Inventors: Franco Bottazzini; Laura Donati, both of Genoa, Italy

[73] Assignee: K.D. Ottica s.n.c., Genoa, Italy

[21] Appl. No.: 689,886

[22] Filed: May 25, 1976

[30] Foreign Application Priority Data

May 26, 1975 Italy ................................. 12621/75

[51] Int. Cl.² .......................... A61F 9/02; G02C 3/02
[52] U.S. Cl. ...................................... 2/443; 351/86; 351/106
[58] Field of Search .............. 351/41, 86, 106, 142, 351/149, 47, 57, 58; 2/428, 429, 434, 439, 441, 443, 452

[56] References Cited  
FOREIGN PATENT DOCUMENTS 1,126,329  11/1956  France ................................. 351/86
1,190,806   4/1959  France ................................. 351/86
  610,452  10/1948  United Kingdom ............... 351/57

*Primary Examiner*—Paul A. Sacher  
*Attorney, Agent, or Firm*—Allison C. Collard

[57] ABSTRACT

System for quickly locking the lenses to, and easily disengaging the same from, sportive goggles, said lenses particularly being graduated lenses or the like for correction of visual defects; and sportive goggles in accordance with said system, particularly a technically advanced and improved form of swimming and diving goggles affording an easy use, a wider visual angle and greater protection for eyes, characterized by a main body with two countersunk seats for lenses and grooves parallel thereto for receiving a locking frame adapted to be locked in place by a disengageable member serving also as connecting member for the positioning strap of the goggles.

3 Claims, 4 Drawing Figures

U.S. Patent    Nov. 8, 1977    4,056,853
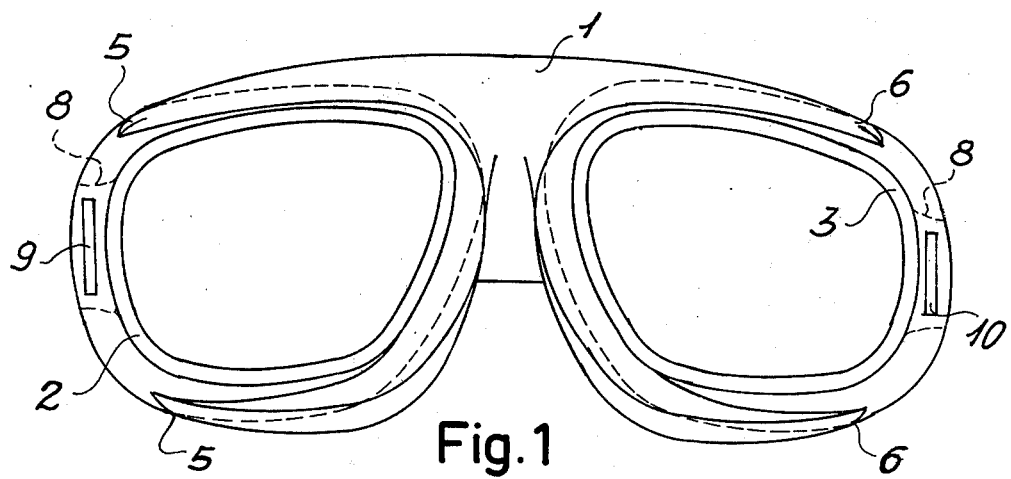
Fig. 1
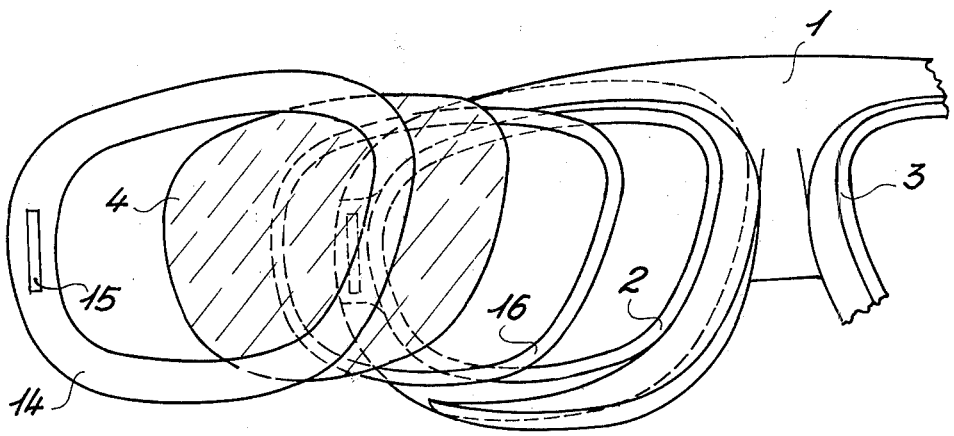
Fig. 2
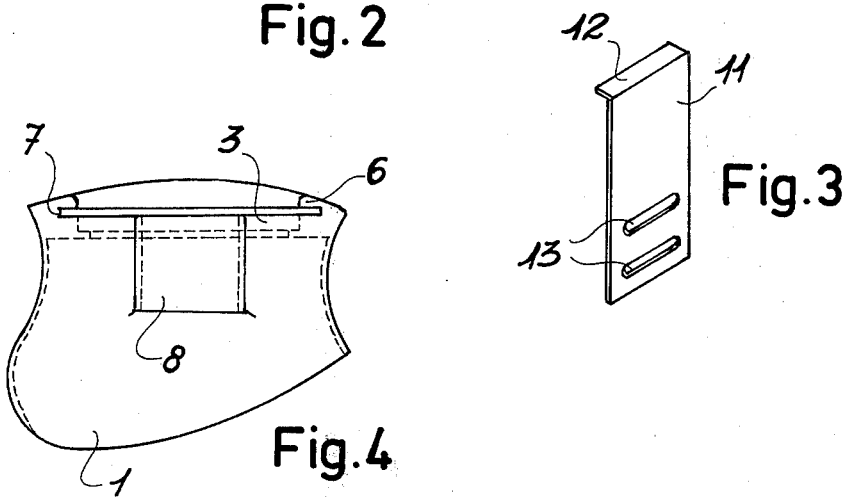
Fig. 3
Fig. 4

SYSTEM FOR LOCKING, IN AN EASILY DISENGAGEABLE MANNER, THE LENSES TO EYEGLASSES, SPORTIVE SWIMMING GOGGLES OR DIVING MASKS AND SIMILAR GENERAL SPORTIVE ARTICLES, AND THE RESULTING ARTICLES

BACKGROUND OF THE INVENTION

This invention relates to a system for locking, in an easily disengageable manner, the lenses to eyeglasses, sportive swimming goggles or diving masks and similar general sportive articles, and the resulting articles.

Substantially, this system and the resulting eyeglasses, goggles and masks have been developed to afford the users wishing to protect their eyes in nautical sportive activities, and specifically those wishing to correct a visual defect, a functional device with easily interchangeable lenses, thus enabling an optician to quickly assemble eyeglasses or diving masks in accordance to protective and/or corrective requirements of a user, either with neutral or graduated lenses and clear or smoked lenses.

The system according to the invention has been developped especially to meet the increasing demand of people wishing, in nautical sporting activities, to have a perfect view of the bottom of the sea and at the same time to protect their eyes efficiently from salts, pollutants or disinfectants in the sea (or in swimming-pools), so as to avoid any irritation and resulting blush, conjunctivitis and blepharitis.

The system according to the invention and the resulting eyeglasses or masks solve this problem completely, the excellent technical features and new solutions being associated to a perfectly anatomical shape, with reduced overall size and yet with a very wide visual angle.

BRIEF DESCRIPTION OF THE DRAWING

The accompanying drawing shows as a non-limiting example, a preferred embodiment of swimming or diving-goggles according to the invention. In the drawing:

FIG. 1 is a front view of the goggles body adapted for quick-mounting the lenses in an easily interchangeable manner;

FIG. 2 is a fragmentary front view of said goggles, showing an exploded view of the members involved with the locking of a lens;

FIG. 3 is a perspective view of the disengageably insertable locking member that is also used for connection with the straps for positioning the goggles;

FIG. 4, with the front face of the goggle body disposed horizontally and the rearward portion of the goggle body depending generally vertically downwardly therefrom is an end view of the goggles body of FIG. 1.

DESCRIPTION OF THE PREFERRED EMBODIMENT

The body 1 of the goggles is made of suitable plastics that is sufficiently rigid as to assure a mutual planar relationship of both lenses and afford a lightweight article. The seats 2 and 3 for each lens are planar, countersunk and positioned in the same plane, each of them having an upper outwardly flaring U-shaped rim 5, 6 respectively, with the opening of the "U" directed towards the respective end of the goggles. As shown in FIG. 4, each of said rims has a groove 7 which is parallel to the bottom of the respective seat 2, 3 and which is open at both ends of the U-shaped rims 5, 6 towards the ends of the goggles. As shown in FIGS. 1 and 4, each end of said body 1 has a projecting casing 8 perpendicular to the bottom of seats 2 and 3 and having a through slit 9, 10, respectively, wherein a a generally L-shaped member 11, preferably of stainless steel sheet, can be disengageably inserted (see FIG. 3). Said member 11 has a forward leg 12, which serves as a projecting abutment lip, which, as explained hereinafter, serves to lock each lens 4, and has two lower slots 13 formed in its rearward leg for hooking connection with the fixing strap (not shown) for positioning the goggles. According to the invention, the inside edges of the goggles, mating with the user's face, are provided with a soft packing of suitable shape for tight mating.

For quick locking and easy replacement of lenses, the invention provides a disengageably insertable frame or annulus 14 made of a strip of stainless steel or other suitable material, having an outside shaping enabling its easy insertion into the groove 7 of each lens seat. In order to achieve the desired locking, each frame 14 is provided with a slot 15 conforming the cross-section of said member 11 and so located as to register, upon complete insertion of said frame, with slits 9 or 10, so as to permit introduction of member 11 from above (relative to FIG. 3); i.e., the rearward leg of member 11 is inserted from in front of body 1 into slits 9 or 10, with the forward leg 12 thereof abutting frame 14.

As shown in FIG. 2, each lens 4 is located in a respective countersunk seat 2 or 3 after locating on the bottom of the latter a soft packing 16. After locating the lens, said frame 14 is inserted completely and then said member 11 is inserted into slits 9, 10 and 15, thus obtaining quickly an immediate locking of the lens. Undesired disengagement of member 11 is prevented by the strap connecting means (not shown). It is apparent that the replacement of the lenses 4 requires only the disconnection of said strap and disengagement of said member 11 and frame 14.

Obviously, the system can be applied also to diving masks or any other eye-protecting means, and the embodiment herein shown and described can be improved or modified without departing from the basic principle of the invention.

We claim:

1. A readily disengageable locking assembly for the lenses of eyeglasses, swimming goggles, diving masks and the like, comprising:
    a lightweight, relatively rigid, plastic body having two rearwardly-disposed, countersunk seats having planar bottoms, lying in the same plane, each of which is configured to accommodate a packing and a lens, and each of which has a forwardly-disposed, oppositely-arranged, outwardly-flaring, U-shaped rim with the ends of the rim directed toward the respective lateral ends of said body, said rims each having a groove formed therein along the inner periphery thereof, said body also having at each lateral end thereof a casing having an elongated slit extending therethrough, perpendicular to the planar bottoms of said seats;
    a packing disengageably received within each of said countersunk seats;
    a lens disengageably received within each of said packed countersunk seats;
    a frame, disengageably and slidably received within said groove of each of said rims, for maintaining said lenses and packing in a correct position with respect to said seats, said frames each having a corresponding slit formed therein which, when fully inserted in said groove of said rims, is aligned with said slit of said casings; and a disengageable locking member insertable within said slits of said frames and casing, to effect locking of said assembly.

2. The locking assembly of claim 1, wherein said locking members comprise a generally flat, L-shaped member, having a relatively short upper leg which serves as an abutment against said frame, and a relatively longer lower leg, which is insertable within slits of said frame and casings and which have formed therein two slots for hooked connection with an article-fixing strap, which connection also prevents any undesired disengagement of the locking assembly.

3. The locking assembly of claim 1, wherein said frames and locking members are fabricated from stainless steel.

* * * * *